(12) United States Patent
Nain

(10) Patent No.: US 12,311,536 B2
(45) Date of Patent: May 27, 2025

(54) VACUUM-BASED END EFFECTOR, SYSTEM, AND METHOD FOR DETECTING PARCEL ENGAGEMENT AND CLASSIFYING PARCELS USING AUDIO

(71) Applicant: MATERIAL HANDLING SYSTEMS, INC., Mt. Washington, KY (US)

(72) Inventor: Gautam Nain, Fisherville, KY (US)

(73) Assignee: FORTNA Systems, Inc., Mt. Washington (KY)

( * ) Notice: Subject to any disclaimer, the term of this patent is extended or adjusted under 35 U.S.C. 154(b) by 0 days.

(21) Appl. No.: 18/630,170

(22) Filed: Apr. 9, 2024

(65) Prior Publication Data

US 2024/0335959 A1 Oct. 10, 2024

Related U.S. Application Data

(60) Provisional application No. 63/495,142, filed on Apr. 10, 2023.

(51) Int. Cl.
*B07C 3/02* (2006.01)
*B07C 3/10* (2006.01)
*B25J 15/06* (2006.01)
*B65G 47/91* (2006.01)

(52) U.S. Cl.
CPC ............ *B25J 15/0683* (2013.01); *B07C 3/02* (2013.01); *B07C 3/10* (2013.01); *B65G 47/91* (2013.01); *B65G 2201/0285* (2013.01)

(58) Field of Classification Search
CPC ... B07C 3/02; B07C 3/10; B65G 47/91; B25J 15/0052; B25J 15/0616; B25J 15/0683; B25J 13/003
USPC .......................................................... 209/590
See application file for complete search history.

(56) References Cited

U.S. PATENT DOCUMENTS

| 2003/0038066 A1* | 2/2003 | Chaume ............... B07C 5/34 |
| | | 209/591 |
| 2007/0038448 A1 | 2/2007 | Sherony |
| 2021/0283780 A1 | 9/2021 | Kilibarda et al. |
| 2021/0387333 A1 | 12/2021 | Diankov et al. |
| 2022/0333922 A1 | 10/2022 | Doi et al. |

FOREIGN PATENT DOCUMENTS

CN 206982740 U 2/2018

OTHER PUBLICATIONS

Korean Intellectual Property Office, International Search Report and Written Opinion issued in corresponding Application No. PCT/US2024/023670 mailed Jul. 23, 2024.

\* cited by examiner

*Primary Examiner* — Joseph C Rodriguez
(74) *Attorney, Agent, or Firm* — Stites & Harbison, PLLC; David W. Nagle, Jr.; Gary N. Stewart

(57) ABSTRACT

A system for detecting parcel engagement and classifying parcels includes: a robot configured to engage and transfer parcels; one or more microphones configured to obtain sound recordings (audio data) and positioned to obtain audio data corresponding to the robot engaging a parcel for transfer; and a control subsystem. The control subsystem includes a controller which receives and processes the audio data obtained by the one or more microphones to detect engagement of the robot with the parcel and to classify a characteristic of the parcel, such as parcel type. The robot can be a vacuum-based end effector, with the one or more microphones a component thereof. A method for classifying parcels is also disclosed.

13 Claims, 10 Drawing Sheets

VACUUM-BASED END EFFECTOR, SYSTEM, AND METHOD FOR DETECTING PARCEL ENGAGEMENT AND CLASSIFYING PARCELS USING AUDIO

CROSS-REFERENCE TO RELATED APPLICATION

The present application claims priority to U.S. Patent Application Ser. No. 63/495,142 filed on Apr. 10, 2023, the entire disclosure of which is incorporated herein by reference.

BACKGROUND OF THE INVENTION

The present disclosure relates to a vacuum-based end effector, system, and method for detecting parcel engagement and classifying parcels using audio.

In a sorting facility for parcels, various parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the parcels within the facility.

When first introduced into the system of conveyors and equipment, the parcels are randomly positioned on a conveyor in a "bulk flow." Thus, within the sorting facility, the first step is often to transform the bulk flow into a singulated flow of parcels in which the parcels are positioned at substantially equal intervals and aligned (i.e., in a single file line) along a conveyor for subsequent processing. A wide variety of singulators exist in the art, many of which employ various combinations of belt conveyors and/or roller conveyors to achieve the desired singulation of the parcels.

For example, commonly assigned U.S. Pat. Nos. 10,646,898 and 10,994,309, which are incorporated herein by reference, describe a system and method for identifying and transferring parcels from a bulk flow of parcels on the first conveyor (or "pick conveyor") to a singulated stream of parcels on the second conveyor (or "place conveyor"). Specifically, a robot singulator (or robot) receives parcels via the pick conveyor, engages each parcel, and then places it onto the place conveyor. A vision and control subsystem communicates instructions to control operation of the robot.

For another example, commonly assigned U.S. Pat. No. 11,753,256, which is also incorporated herein by reference, describes another method and system for transferring parcels from a bulk flow into a singulated stream of parcels. An exemplary conveyor includes: a pick conveyor defining a picking area for a bulk flow of parcels; a place conveyor positioned downstream of the picking area; a first robot singulator (or first robot) and a second robot singulator (or second robot), which work in parallel to transfer parcels within the picking area into a singulated stream on the place conveyor; and a vision and control subsystem that is operably connected to the first robot and the second robot, such that the vision and control subsystem can communicate instructions to control operation of such components.

To facilitate engagement and transport of parcels by a robot singulator, vacuum-based end effectors are commonly utilized in parcel transfer systems and often include one or more vacuum cups that provide a suction force sufficient to grasp and hold a target parcel when placed in fluid communication with an activated vacuum source. To detect pneumatic engagement with a parcel, each vacuum cup of the end effector can be operably connected to a vacuum sensor that is configured to provide vacuum pressure feedback indicative of whether the vacuum cup has pneumatically engaged with the parcel, as disclosed, for example, in commonly assigned U.S. Pat. No. 11,524,403, which is incorporated herein by reference. The feedback provided by vacuum sensors, however, may not include information which enables the parcel transfer system to distinguish between the type of parcel (e.g., a box, a flexible plastic ("poly") bag, or a flat parcel) engaged by the robot singulator. That is, the vacuum sensors may not provide data which enables the parcel transfer system to classify the parcels within the system, which may be important for examination, in rejecting or directing certain parcels to an intended destination, and/or determining the appropriate motion profile for the robot. As a result, image data from two-dimensional and/or three-dimensional cameras of the vision and control subsystem of the parcel transfer system is often relied upon for the detection and classification of parcels. For accurate detection and classification, higher resolution images which delay the inference time on detection and classification models may be required; the prolonged processing/inference times resulting from the use of such images can adversely affect system throughput efficiency. System throughput can also be impeded in instances where, due to the frame rate limitations of the camera(s) of the vision and control subsystem, the vision and control subsystem is unable to recognize parcels within the system in real-time. Thus, in order to obtain desired processing speeds and throughput volumes, the use of expensive, high-frame-rate cameras is commonly required.

Accordingly, a vacuum-based end effector, system, and method which provides non-image-based parcel engagement detection and parcel clarification would be both beneficial and desirable.

SUMMARY OF THE INVENTION

The present disclosure includes a system for transferring parcels in which audio data obtained by one or more microphones is utilized to detect parcel engagement and identify a characteristic of a parcel. In this regard, such system may also be characterized as a system for detecting parcel engagement and classifying parcels.

An exemplary system for detecting parcel engagement and classifying parcels made in accordance with the present disclosure includes: a robot configured to engage and transfer parcels; one or more microphones configured to obtain sound recordings (audio data) and positioned to obtain audio data corresponding to the robot engaging a parcel for transfer; and a control subsystem. The control subsystem includes a controller which receives and processes the audio data obtained by the one or more microphones to detect engagement of the robot with the parcel and to classify a characteristic of the parcel.

In some embodiments, the robot includes an exemplary vacuum-based end effector made in accordance with the present disclosure which enables the robot to pneumatically engage the parcel. An exemplary vacuum-based end effector made in accordance with the present disclosure includes: a base plate with an upper surface configured for connection to a framework of the robot; one or more vacuum cups connected to the base plate and configured to be placed in fluid communication with a vacuum source; and the one or more microphones, which are positioned below the upper surface of the base plate and mounted to the base plate and/or the one or more vacuum cups.

In some embodiments, the vacuum-based end effector includes a plurality of vacuum cups.

In some embodiments the one or more microphones includes a microphone which is centrally positioned relative to at least two vacuum cups.

In some embodiments, the vacuum-based end effector includes a single microphone.

In some embodiments, the controller is operably connected to the robot and/or the vacuum source, such that the controller can communicate instructions which affect operation of the robot and/or the vacuum source based on the audio data obtained by the one or more microphones.

In some embodiments, the controller is configured to identify a parcel type of the parcel engaged by the robot based on the audio data obtained by the one or more microphones. In some embodiments, the controller is configured to identify a parcel as a box-type parcel, a flexible plastic bag, or a flat parcel based on the audio data obtained by the one or more microphones. In some embodiments, the controller identifies the characteristic of the parcel engaged by the robot by inputting the audio data obtained by the one or more microphones into an audio classifier model configured to identify parcel type based on audio data. In some embodiments, the audio classifier model is a neural network pre-trained on a collection of audio samples obtained by the one or more microphones. The collection of audio samples can include audio samples corresponding to the one or more vacuum cups of the vacuum-based end effector engaging a plurality of parcels of different types at different times. In some embodiments, the audio classifier model is a convolutional neural network.

An exemplary method for classifying parcels is also disclosed.

DESCRIPTION OF THE INVENTION

The present disclosure includes a vacuum-based end effector, system, and a method for detecting parcel engagement and classifying parcels using audio.

Figure 1:
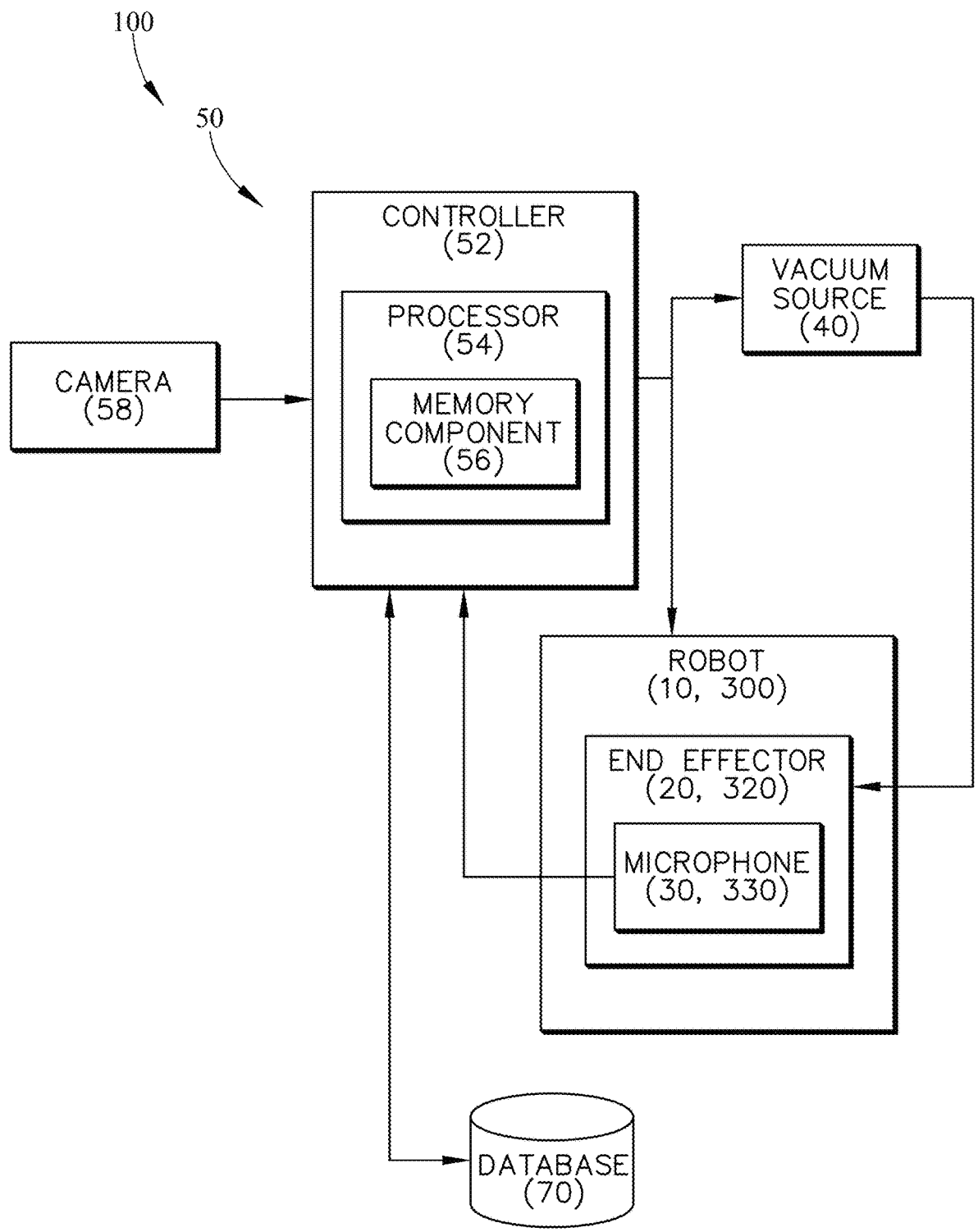
FIG. 1 is a schematic diagram of an exemplary system for detecting parcel engagement and classifying parcels made in accordance with the present disclosure.
Figure 2:
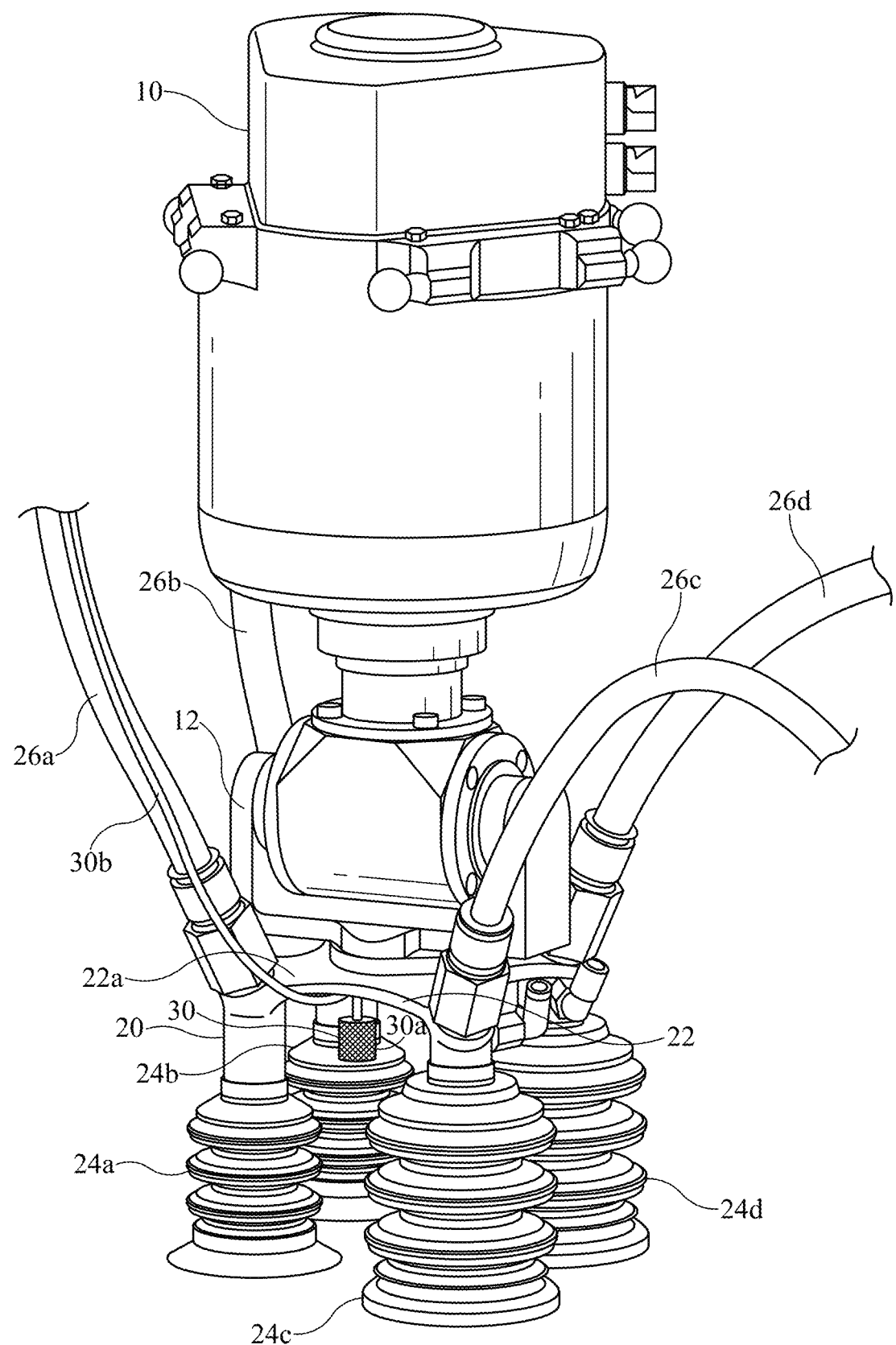
FIG. 2 is a perspective view of a robot, including an exemplary vacuum-based end effector made in accordance with the present disclosure, which may be utilized in the exemplary system for detecting parcel engagement and classifying parcels of FIG. 1.

Referring first to FIGS. 1 and 2, an exemplary system for detecting parcel engagement and classifying parcels (or system) 100 made in accordance with the present disclosure includes: a robot 10 configured to engage and transfer parcels (not shown); one or more microphones 30 configured to obtain sound recordings (audio data) and positioned to obtain audio data corresponding to the robot 10 engaging a parcel for transfer; and a control subsystem 50 with a controller 52 that is configured to receive and process the audio data obtained by the one or more microphones 30 while the system 100 is in use. In this exemplary embodiment, the robot 10 includes an exemplary vacuum-based end effector (or end effector) 20 made in accordance with the present disclosure. Using the audio data received from the one or more microphones 30, the controller 52 can detect pneumatic engagement of the end effector 20 with the parcel and/or identify a characteristic of the parcel, such as the particular type of parcel the parcel is, as further described below. In some embodiments, the controller 52 may be operably connected to, and configured to control the operation of, certain system components based on the audio data received from the one or more microphones 30, as is also further described below.

It is important to recognize that, in the present application, the term "parcel" is not intended to be limiting and can include any article, item, or object that may be engaged and transferred by the robot 10, e.g., from a first conveyor (or pick conveyor) to a second conveyor (or place conveyor).

Referring now specifically to FIG. 2, the robot 10 includes a framework 12 to which the end effector 20 is mounted. In this exemplary embodiment, the framework 12 of the robot 10 is a component of a Delta P6 robot manufactured by Schneider Electric and available, for instance, from Advantage Industrial Automation of Duluth, Georgia. It should be appreciated, however, that the framework 12 is not necessarily limited to such construction, but rather may be any portion of a robot to which the end effector 20 described herein can be connected and utilized with. For instance, as reflected in the discussion below with reference to FIGS. 8-10, alternative embodiments in which the framework of the robot is a portion of a six-axis articulating robot arm are also expressly contemplated herein.

Referring still to FIG. 2, in this the exemplary embodiment, the end effector 20 includes: a base plate 22 configured for connection to a framework 12 of the robot 10; one or more vacuum cups 24a, 24b, 24c, 24d for engaging parcels connected to the base plate 22; and the one or more microphones 30, which are positioned to obtain audio data as the one or more vacuum cups 24a, 24b, 24c, 24d, or a subset thereof, engage a target parcel. In this exemplary embodiment, the end effector 20 is of identical construction to the end effector disclosed in commonly assigned U.S. Pat. No. 11,524,403, which is incorporated herein by reference, except for the inclusion of the one or more microphones 30 and that each vacuum cup 24a, 24b, 24c, 24d has a lip generally comprised of either a silicone rubber or polyurethane (like the vacuum cups described in U.S. patent application Ser. No. 11,839,987, which is also commonly assigned and incorporated herein by reference). Accordingly, in this exemplary embodiment, the end effector 20 includes a plurality of vacuum cups 24a, 24b, 24c, 24d. Specifically, in this exemplary embodiment, the end effector includes four vacuum cups 24a, 24b, 24c, 24d, of which a first vacuum cup 24a and a second vacuum cup 24b are generally comprised of a silicone rubber, and a third vacuum cup 24c and a fourth vacuum cup 24d are generally comprised of polyurethane. As shown, in this exemplary embodiment, the system 100 further includes a number of vacuum lines 26a, 26b, 26c, 26d corresponding to the number of the vacuum cups 24a, 24b, 24c, 24d which place the vacuum cups 24a, 24b, 24c, 24d in fluid communication with a vacuum source 40 (FIG. 1) that is configured to draw air through the vacuum lines 26a, 26b, 26c, 26d and thus the vacuum cups 24a, 24b, 24c, 24d in fluid communication therewith.

Of course, the total number of vacuum cups, and thus the total number of corresponding vacuum lines, can be modified to better accommodate different parcel sorting applications and/or environments without departing from the spirit and scope of the present disclosure. In this regard, it is noted that the system operations described herein with respect to determining pneumatic engagement of the end effector 20 with a parcel and/or classifying (identifying) a characteristic of the parcel based on audio data can be realized in alternative embodiments in which the end effector 20 includes fewer than four vacuum cups (e.g., a single vacuum cup), as well as in alternative embodiments in which the end effector 20 includes more than four vacuum cups.

It is also appreciated that the material construction of some or all of the vacuum cups 24a, 24b, 24c, 24d can be adapted to better accommodate different parcel sorting applications and/or environments without departing from the spirit and scope of the present disclosure. For instance, in some alternative embodiments, the end effector 20 may include: one or more vacuum cups with a lip or insert composed of a porous foam material, like that described in U.S. Pat. No. 11,241,802, which is commonly assigned and incorporated herein by reference; one or more vacuum cups with a lip composed of an Elastodur material, such as the Bellows Suction Cups SPB2 (2.5 Folds) distributed by J. Schmalz GmbH of Glatten, Germany; and/or one or more vacuum cups with a lip composed of nitrile rubber, such as the FSGC 50 NBR-55 G3/8-AG bellows suction cups, distributed by Schmalz GmbH of Glatten, Germany.

Furthermore, while the construction of the base plate 22 of the end effector 20 in this exemplary embodiment is consistent with that disclosed in U.S. Pat. No. 11,524,403, it is appreciated that the construction of the base plate 22 is not necessarily so limited. Rather, the base plate 22 may be of any construction which is configured for connection to the framework 12 of the robot 10 and which permits the vacuum cups 24a, 24b, 24c, 24d to be connected thereto and carried thereby in any manner which permits the vacuum cups 24a, 24b, 24c 24d to be placed in fluid communication with the vacuum source 40.

Referring still to FIG. 2, in this exemplary embodiment, the system 100 includes a single microphone 30 that is positioned to register and obtain audio data corresponding to the noise made by one or more of the vacuum cups 24a, 24b, 24c, 24d as such vacuum cups engage a target parcel. Specifically, in this exemplary embodiment, the microphone 30 is positioned relative to each of the vacuum cups 24a, 24b, 24c, 24d, such that the microphone 30 can register and obtain sound recordings corresponding to each vacuum cup 24a, 24b, 24c, 24d of the end effector 20 as the vacuum cup 24a, 24b, 24c, 24d enters into engagement with a target parcel. To this end, in this exemplary embodiment, the microphone 30 is mounted to the base plate 22, such that a head 30a of the microphone 30 is positioned below the upper surface 22a of the base plate 22 to which the framework 12 of the robot 10 is attached. In this exemplary embodiment, the microphone 30 is mounted to the base plate 22 using one or more cable ties (not shown). Of course, it is appreciated that other known fastening means suitable for securing the microphone 30 to the base plate 22 may alternatively be utilized without departing from the spirit and scope of the present disclosure. Furthermore, in this exemplary embodiment, the microphone 30 is mounted so that the head 30a of the microphone 30 is centrally positioned relative to the vacuum cups 24a, 24b, 24c, 24d of the end effector 20. In other words, the head 30a of the microphone 30 is positioned substantially equidistant to each respective vacuum cup 24a, 24b, 24c, 24d of the end effector 20.

Of course, the positioning of the microphone 30 can be adjusted to accommodate different sorting environments, sorting applications, and/or vacuum cup arrangements and to regulate which vacuum cups 24a, 24b, 24c, 24d of the end effector 20 are registered by the microphone 30. For instance, in some embodiments and implementations, it may be desirable to obtain sound recordings only from the first vacuum cup 24a and the second vacuum cup 24b; as such, the microphone 30 may be positioned between a proximal end of the first vacuum cup 24a and a proximal end of the second vacuum cup 24b. Furthermore, although the end effector 20 is primarily described herein as including only a single microphone, alternative embodiments and implementations in which multiple microphones are utilized, where each respective microphone corresponds to and is configured to obtain sound recordings of one or more vacuum cups 24a, 24b, 24c, 24d are also contemplated. For instance, in one alternative embodiment and implementation, the number of microphones utilized may correspond to the number of vacuum cups, and each respective microphone may be positioned as to register and obtain sound recordings of a single vacuum cup 24a, 24b, 24c, 24d of the end effector 20. In another alternative embodiment, the end effector 20 may include a plurality of microphones, where one or more of the microphones are centrally positioned between a subset of the vacuum cups 24a, 24b, 24c, 24d. For instance, in one such embodiment, one microphone may be positioned between vacuum cup 24a and vacuum cup 24b to register the sound of such suction cups entering into engagement with a parcel, while another microphone may be positioned between vacuum cup 24c and vacuum cup 24d to register the sound of such suction cups entering into engagement with a parcel. Additionally, while the microphone 30 is sometimes referred to herein as being mounted to the base plate 22 of the end effector 20, the end effector 20 is not necessarily limited to such construction. Rather, alternative end effector constructions in which some or all of the microphones utilized within the system 100 are additionally (i.e., in addition to being mounted to the base plate 22) or alternatively mounted to one or more of the vacuum cups 24a, 24b, 24c, 24d using known fasteners (e.g., brackets) are also contemplated herein.

Although not shown, in this exemplary embodiment, the base plate 22 can include a central opening through which a cable 30b of the microphone 30 can extend through from an underside of the base plate 22 to prevent the cable 30b from being disturbed as the end effector 20 engages and transfers parcels. Further, to this end, the cable 30b of the microphone 30 may also be secured to one or more of the vacuum lines 26a, 26b, 26c, 26d and/or the framework 12 of the robot 10 using known fastening means, such as cable ties.

Figure 3:
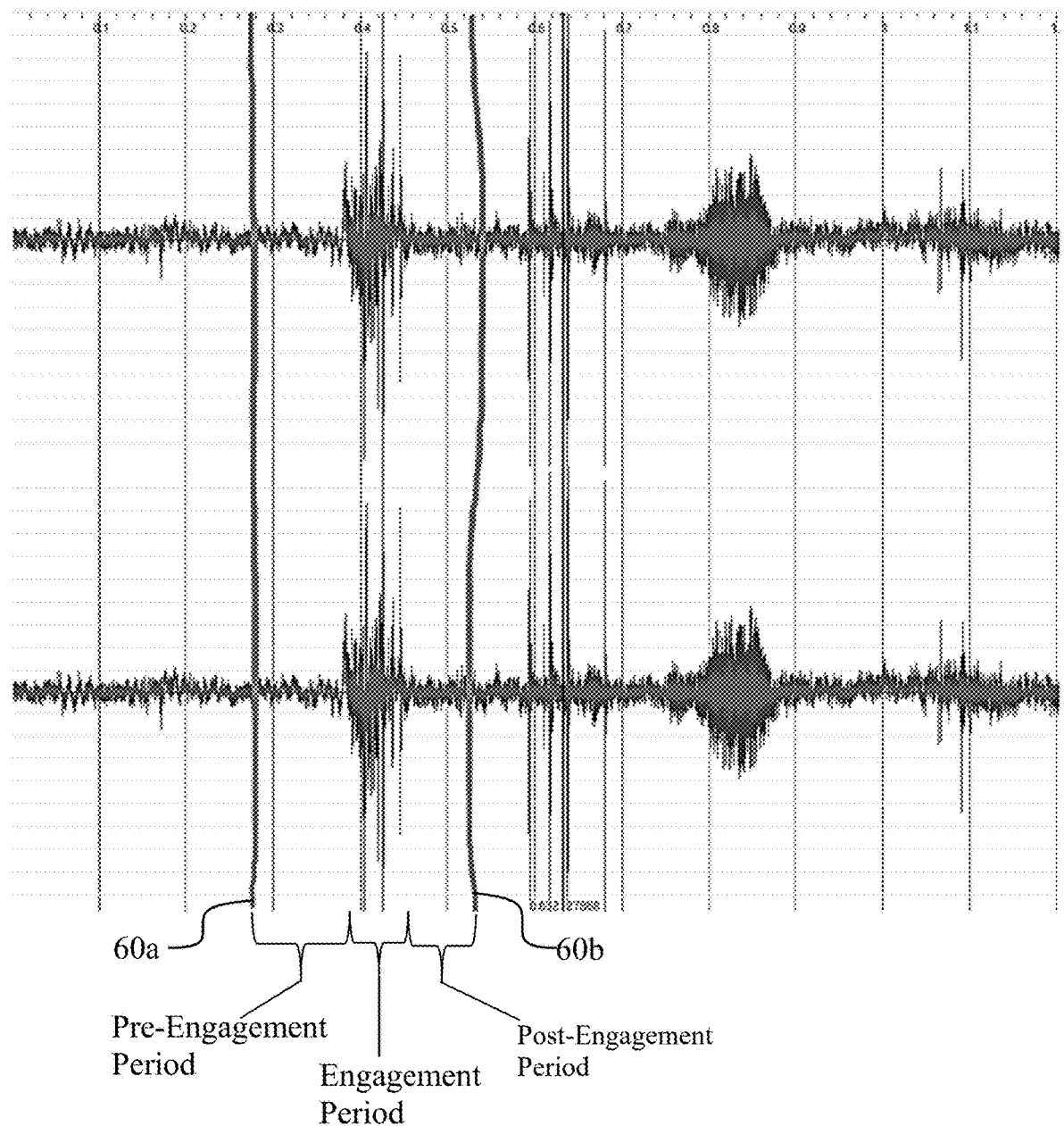
FIG. 3 is an image of an audio signal of a sound recording obtained by the robot of FIG. 2 while engaging and transferring a box-type parcel.
Figure 4:
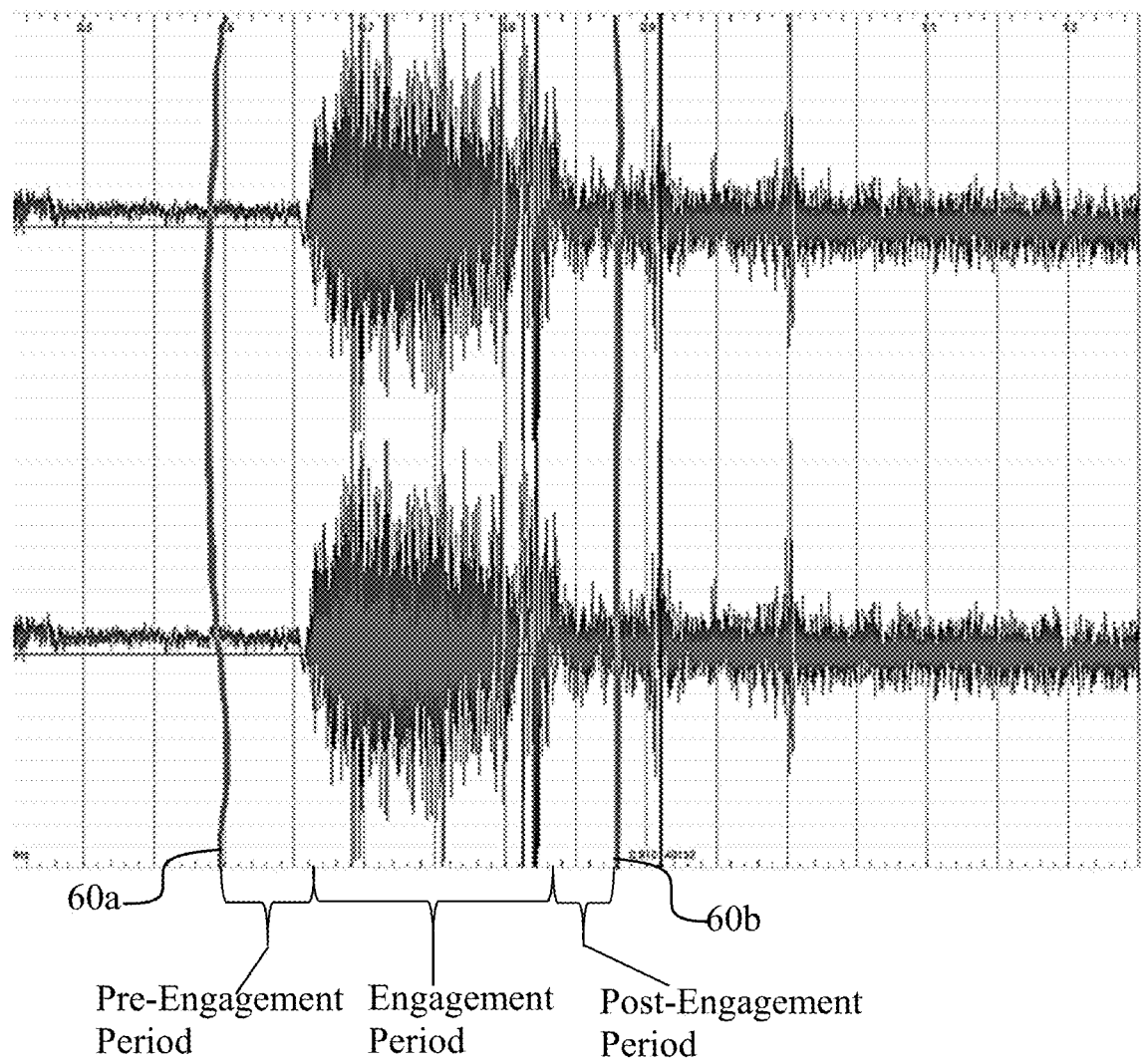
FIG. 4 is an image of an audio signal of a sound recording obtained by the robot of FIG. 2 while engaging and transferring a poly bag.
Figure 5:
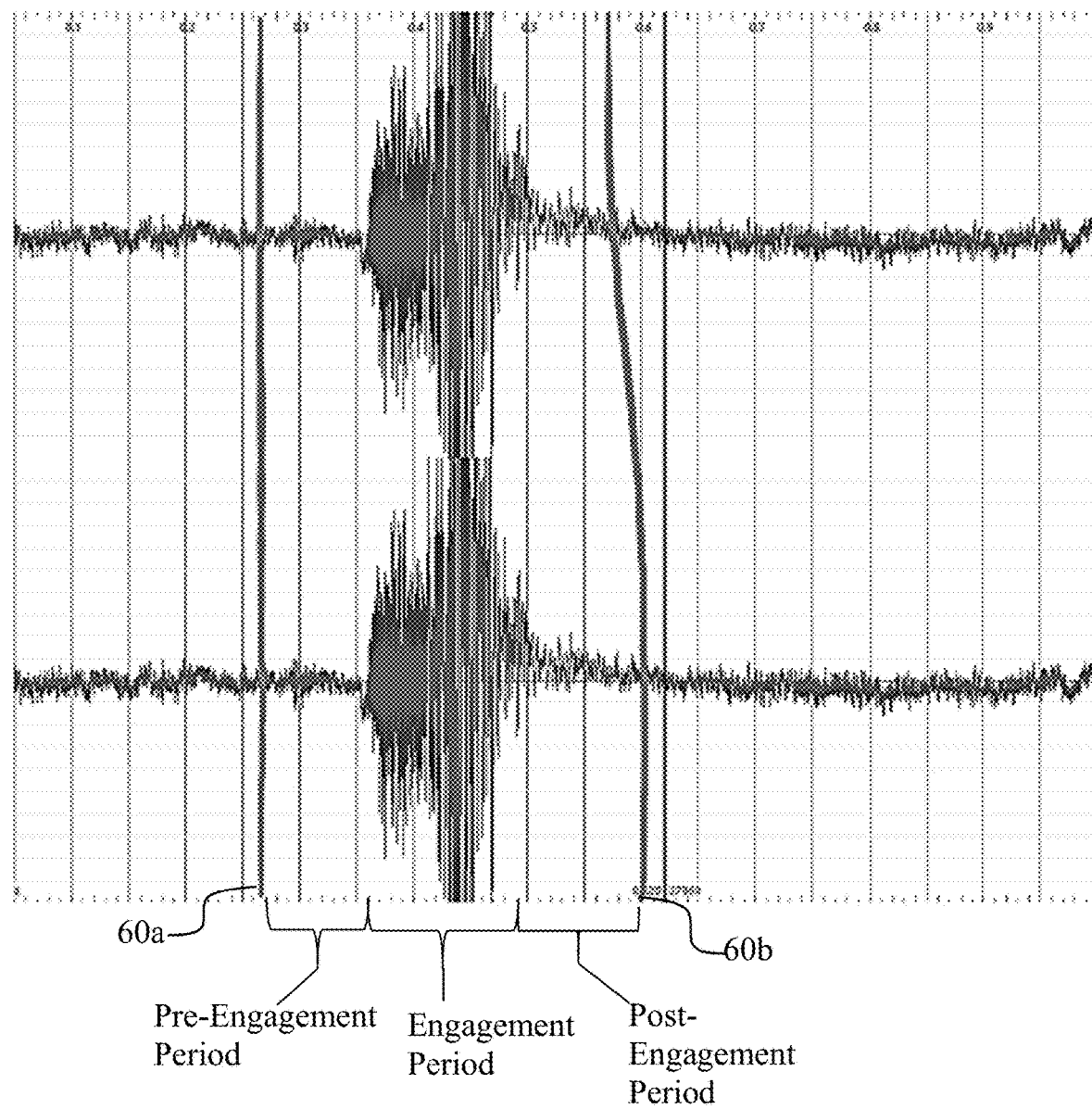
FIG. 5 is an image of an audio signal of a sound recording obtained by the robot of FIG. 2 while engaging and transferring a flat parcel.

FIGS. 3-5 are images of audio signals of sound recordings obtained by the microphone 30 of the end effector 20 as the robot 10 engaged and transferred three different types of parcels. In particular, the audio signals shown in FIGS. 3-5 are from sound recordings obtained by the microphone 30 as the robot 10 engaged and transferred a box-type parcel, a poly bag, and a flat parcel, respectively, at different times. Each of the vacuum cups 24a, 24b, 24c, 24d of the end effector 20 were fully engaged (i.e., engaged as to form an airtight seal) with the box-type parcel, the poly bag, or the flat parcel during the period of engagement and transfer by the robot 10. The box-type parcel, in this case, was constructed of a cardboard (paper pulp) material. The flat parcel, in this case, was a flat envelope constructed of a synthetic material, such as Tyvek®.

In FIGS. 3-5, the portion of the audio signal located between the vertical lines 60a, 60b corresponds to a portion of the sound recording (audio data) obtained by the microphone 30 during a period encompassing the time immediately preceding the engagement of the vacuum cups 24a, 24b, 24c, 24d with the box-type parcel, the poly bag, or the flat parcel to the time immediately following post engagement of the vacuum cups 24a, 24b, 24c, 24d with the box, the poly bag, or the flat parcel. As evidenced by comparing the audio signals shown in FIGS. 3-5, the recorded sound varies significantly depending on the type of parcel engaged by the vacuum cups 24a, 24b, 24c, 24d, thus indicating that the sound produced by the vacuum cups 24a, 24b, 24c, 24d entering into engagement with a target parcel can serve as an identifier which can be utilized by the control subsystem 50 to classify (identify) parcels engaged by the robot 10, as further described below. As further evidenced by comparing the audio signals in FIGS. 3-5, the intensity of the recorded sound, and thus the audio signal corresponding thereto, significantly decreases once the vacuum cups 24a, 24b, 24c, 24d are in full pneumatic engagement with a target parcel, thus indicating that sound recordings obtained by the microphone 30 can also be utilized by the control subsystem 50 to detect whether the end effector 20 has engaged a target parcel, as further described below.

Referring now to FIGS. 2-5, in this exemplary embodiment, the microphone 30 is a dual-channel microphone. Accordingly, each respective audio signal shown in FIGS. 3-5 actually comprises two separate audio signals: a first audio signal corresponding to a first channel of the microphone 30 (upper audio signal in FIGS. 3-5); and a second audio signal corresponding to a second channel of the microphone 30 (lower audio signal in FIGS. 3-5). The sound recordings represented in FIGS. 3-5 were obtained by the Lavalier GO microphone manufactured and distributed by RØDE Microphones of Sydney, Australia. Use of a microphone with an omnidirectional polar pattern, such as the Lavalier GO microphone, for the microphone 30 can prove beneficial in instances where it is desired for the microphone 30 to obtain sound recordings of multiple vacuum cups as microphones with such polar pattern can pick up sound equally in all directions. While the use of a multi-channel microphone may be preferable in some applications, as the multiple channels may aid, for example, in audio signal acquisition redundancy, noise cancellation, and sound localization, embodiments in which the microphone 30 is a single-channel microphone are also contemplated, and, in some applications, may be preferred.

Referring again to FIG. 1, in this exemplary embodiment, the control subsystem 50 includes a controller 52 and a camera 58 that is operably connected to the controller 52, such that the controller 52 can receive image data from the camera 58. The camera 58 is positioned in proximity to the robot, or another structure (not shown) to which the framework 12 of the robot 10 is mounted) so that an area (e.g., a portion of a conveyor) from which parcels will ordinarily be engaged and transferred by the robot 10 (or "pick area") is within the field of view of the camera 58. The camera 58 is configured to acquire two-dimensional and/or three-dimensional images of the pick area. Suitable cameras which may be utilized as the camera 58 include the image sensors manufactured and distributed by ifm Effector Inc. of Malvern, Pennsylvania. In this exemplary embodiment, the camera 58 is configured to obtain images substantially continuously. Alternative embodiments are contemplated, however, in which the camera 58 is operably connected to the controller 52, such that the controller 52 can selectively communicate instructions (signals) to regulate operation of the camera 58, and the camera 58 is selectively activated to obtain images of the pick area in response to instructions (or signals) communicated from the controller 52. Although the camera 58 is generally referred to herein and illustrated within the drawings as including only a single camera, embodiments in which the camera 58 comprises multiple cameras are also contemplated herein.

Referring still to FIG. 1, in this exemplary embodiment, images of the pick area acquired by the camera 58 are transmitted to the controller 52 as image data for subsequent processing. In alternative embodiments, the camera 58 may be a component of a larger vision unit, such that the images acquired by the camera 58 may be processed locally at the vision unit, with the processed images then being transmitted to the controller 52 as image data for subsequent processing. In such embodiments, the vision unit will typically further include a processor (not shown) configured to execute instructions (routines) stored in a memory component (not shown) or other computer-readable medium to process the images acquired by the camera 58. Suitable processors for use in such a vision unit include that provided within the Jetson Nano computer manufactured and distributed by Nvidia Corporation of Santa Clara, California. Of course, other processors suitable for locally processing the images acquired by the camera 58 may also be used.

Referring still to FIG. 1, the controller 52 includes a processor 54 configured to execute instructions stored in a memory component 56 or other computer-readable medium to perform the various operations of the controller 52 described herein. In this exemplary embodiment, the controller 52 is a programmable logic controller or other industrial controller. The controller 52 is connected to the camera 58 to facilitate the transmission of data from the camera 58 to the controller 52 either by wired connection (e.g., Ethernet connection) or by wireless connection (e.g., via a network) using known interfaces and protocols.

Although the processor 54 and the memory component 56 are primarily referred to in singular form within the present description for simplicity in explanation, such reference is not intended to limit the control subsystem 50 to a construction in which the controller 52 necessarily includes only a single processor and/or memory component. Rather, embodiments in which the controller 52 includes only a single processor and/or memory component, as well as embodiments in which the controller 52 includes multiple processors and/or memory components are contemplated herein.

Referring still to FIG. 1, the microphone 30 is also operably connected to the control subsystem 50, such that the microphone 30 can communicate sound recordings (audio data) to the controller 52 for subsequent processing. In this exemplary embodiment, the microphone 30 is configured to obtain sound recordings substantially continuously. Alternative embodiments are contemplated, however, in which the microphone 30 is operably connected to the controller 52, such that the controller 52 can selectively communicate instructions (signals) to regulate operation of the microphone 30, and the microphone 30 is selectively activated to obtain sound recordings in response to instructions (or signals) communicated from the controller 52. In this exemplary embodiment, the controller 52 is connected to the microphone 30 via cable 30b. Alternative embodiments in which the microphone 30 is a wireless microphone operably connected to the controller 52 via a wireless connection (e.g., via a network) using known interfaces and protocols are, however, also contemplated herein.

Referring still to FIG. 1, in this exemplary embodiment, the control subsystem 50 is also operably connected to the robot 10 and the vacuum source 40, such that the controller 52 can selectively communicate instructions (signals) which regulate the movement of the robot 10 and the suction force applied by the vacuum source 40. In this regard, the controller 52 is connected to the robot 10 and the vacuum source 40 by known wired connections and/or by known wireless connections (e.g., via network) using known interfaces and protocols to facilitate the transmission of instructions which influence the operation of the robot 10 and the vacuum source 40.

Figure 6:
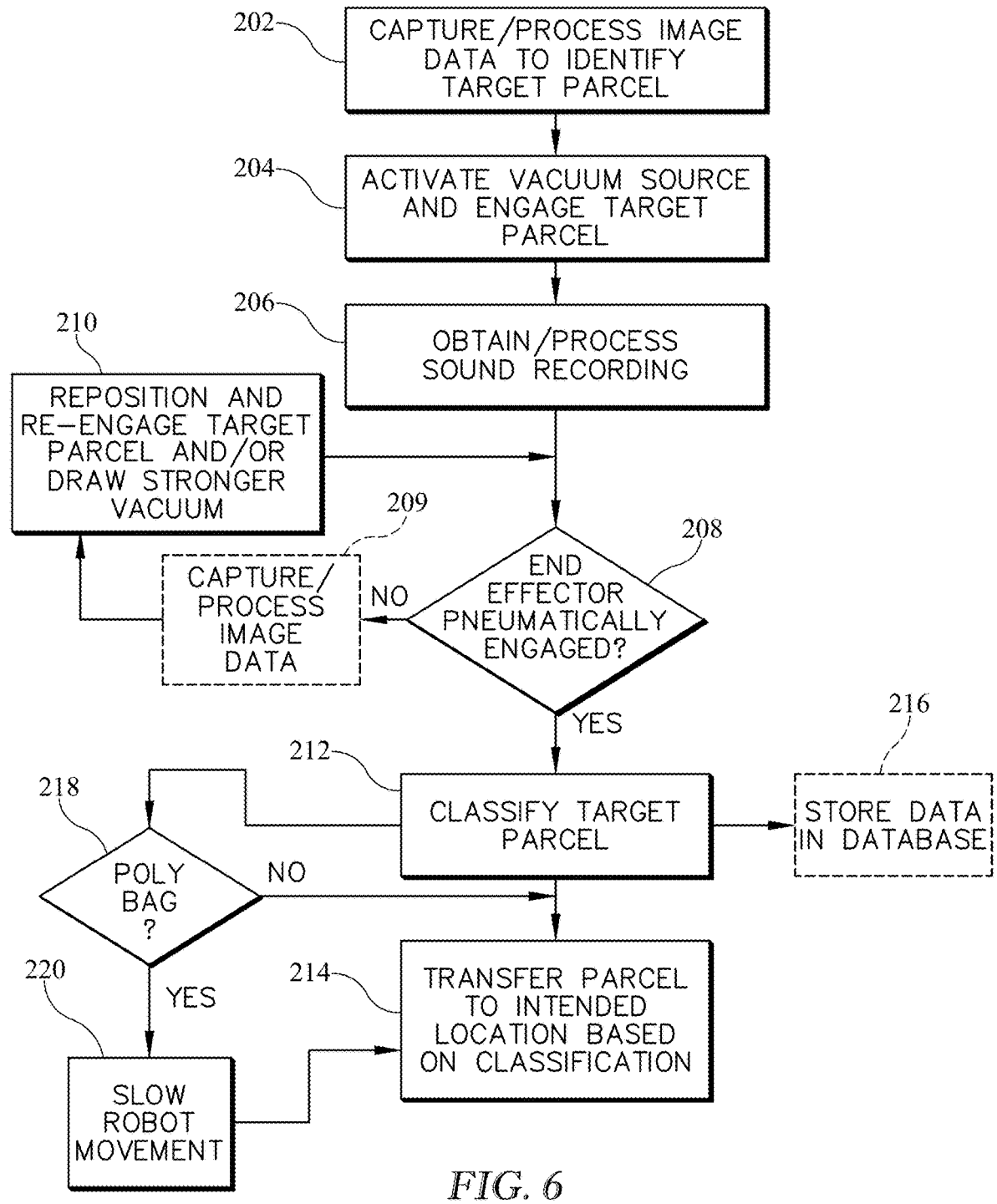
FIG. 6 is a flow diagram of an exemplary routine for transferring a parcels.

As reflected in the exemplary routine shown in FIG. 6, in use, the system 100 can be utilized to transfer parcels to an intended destination, with the parcel engagement, transfer, and deposit operations of the robot 10 being informed by the image data obtained by the camera 58 and audio data obtained by the microphone 30. In this regard, and referring now to FIGS. 1, 2, and 6, when the system 100 is in use, the controller 52 receives and processes image data from the camera 58 to initially identify one or more target parcels within the pick area in need of transport by the robot 10, as indicated by block 202 in FIG. 6. Upon detecting the presence of a target parcel in need of transport within the pick area, the controller 52 communicates instructions which cause the vacuum source 40 to be activated as to draw air through the vacuum cups 24a, 24b, 24c, 24d and the robot 10 to engage the target parcel within the pick area, as indicated by block 204 in FIG. 6, and then subsequently transfer the target parcel to an intended destination for deposit (e.g., a designated area of a conveyor), as indicated by block 214 in FIG. 6. Such intended destination may also be characterized as a "place area." Depending on the parcel sorting application and/or environment, there may multiple potential locations (or place areas) where the target parcel can be deposited. In this exemplary embodiment and implementation, the transfer of parcels by the robot 10 to a particular destination is informed by the audio data obtained by the microphone 30, as further described below.

Referring still to FIGS. 1, 2, and 6, as the vacuum cups 24a, 24b, 24c, 24d enter into pneumatic engagement with the target parcel, the microphone 30 obtains a sound recording corresponding to one or more of the vacuum cups 24a, 24b, 24c, 24d engaging the target parcel, which is subsequently transmitted to the controller 52 as audio data for further processing, as indicated by block 206 in FIG. 6. Alternative embodiments are, however, contemplated in which the end effector 20 further includes an onboard processor that is operably connected to the microphone 30 and the control subsystem 50, such that the onboard processor processes the sound recording obtained by the microphone 30 and subsequently transmits the processed sound recording to the controller 52 as audio data. In other words, embodiments and implementations in which the audio data is pre-processed prior to transmission to the controller 52 are contemplated herein.

Referring now to FIGS. 1-6, in this exemplary embodiment and implementation, the controller 52 is configured to process the received audio data to: (i) detect whether the end effector 20 is sufficiently pneumatically engaged with the target parcel as to enable transport thereof by the robot 10 to the place area, as indicated by decision 208 in FIG. 6; and (ii) classify the type of parcel the target parcel is, as indicated by block 212 in FIG. 6. In determining whether the end effector 20 is sufficiently pneumatically engaged with the target parcel as to facilitate transfer of the target by the robot 10 without inadvertently dropping the target parcel, in this exemplary embodiment and implementation, a pre-trained pneumatic engagement classifier model is utilized. The pneumatic engagement classifier model is a neural network, and, more specifically, in this case, a convolutional neural network, pre-trained on audio data corresponding to various instances where some or all of the vacuum cups 24a, 24b, 24c, 24d failed to pneumatically engage, partially pneumatically engaged, or fully pneumatically engaged (i.e., formed an airtight seal with) a target parcel. It should be appreciated, however, that the specific architecture for the neural network for the pneumatic engagement classifier model can be adapted to accommodate different applications and/or environments. Accordingly, alternative embodiments in which the neural network acting as the pneumatic engagement classifier utilizes a different architecture are also contemplated. Accordingly, in this exemplary embodiment and implementation, determining whether the end effector 20 is pneumatically engaged with a target parcel includes inputting audio data corresponding to one or more of the vacuum cups 24a, 24b, 24c, 24d engaging a target parcel received by the controller 52 into the pneumatic engagement classifier model, which, in this exemplary embodiment and implementation, corresponds to a set of instructions stored in the memory component 56 of the controller 52, to produce an output indicative of whether the end effector 20 has sufficiently pneumatically engaged the target parcel. Using such output, the controller 52 then determines whether the end effector 20 has sufficiently pneumatically engaged the target parcel.

Referring still to FIGS. 1-6, alternative determination means may additionally or alternatively be employed to determine whether the end effector 20 is sufficiently pneumatically engaged with the target parcel. For instance, in one embodiment, the controller 52 may make such determination by comparing the received audio data to a predetermined threshold. In such embodiment, the controller 52 may analyze the received audio data to initially identify which portion of the audio data corresponds to a period in which the vacuum cups 24a, 24b, 24c, 24d entered into engagement with the target parcel (labeled as "engagement period" in FIGS. 3-5). The controller 52 may then analyze a portion of the audio data corresponding to a predetermined period following such engagement period (labeled as the "post-engagement period" in FIGS. 3-5) to determine if the intensity (loudness) reflected in the audio data at the post-engagement period is at or below a predetermined threshold. Audio data with higher intensity levels during the post-engagement period will typically correspond to portions of the sound recording in which more air is being drawn into the end effector 20, which may be indicative of: some or all of the vacuum cups 24a, 24b, 24c, 24d not being engaged with the target parcel; some or all of the vacuum cups 24a, 24b, 24c, 24d being only partially engaged with the target parcel; and/or the vacuum source 40 not drawing a strong enough vacuum as to provide some or all of the vacuum cups 24a, 24b, 24c, 24d with a suction force sufficient for the lips of such vacuum cups 24a, 24b, 24c, 24d to form an airtight seal with the target parcel. If the intensity of the audio data corresponding to the sound recording at the post-engagement period is above the predetermined threshold, the controller 52 will determine that the end effector 20 has not sufficiently pneumatically engaged the target parcel. Conversely, if the intensity of the audio data corresponding to the sound recording at the post-engagement period is at or below the predetermined threshold, the controller 52 will determine that the end effector 20 has sufficiently pneumatically engaged the target parcel.

Referring still to FIGS. 1-6, if the controller 52 determines that the end effector 20 is not sufficiently pneumatically engaged with the target parcel, in this exemplary embodiment and implementation, the controller 52 communicates instructions which cause the robot 10 to reposition the end effector 20 relative to the target parcel and/or communicate instructions which cause the vacuum source 40 to draw a stronger vacuum (i.e., increase the volume of airflow drawn by the vacuum course 40), as indicated by block 210 in FIG. 6. In instances where the robot 10 is to be repositioned, additional image data of the target parcel may be captured by the camera 58 and processed by the controller 52 to inform the instructions communicated by the controller 52 to the robot 10, as indicated by block 209 in FIG. 6. If, on the other hand, the controller 52 determines that the end effector 20 is sufficiently engaged with the target parcel, in this exemplary embodiment and implementation, the controller 52 proceeds to classify the target parcel as a particular parcel type, as indicated by block 212 in FIG. 6. In some embodiments and implementations, the microphone 30 may continuously obtain sound recordings, and the controller 52 may continuously assess whether the end effector 20 is sufficiently pneumatically engaged with the target parcel and adjust the suction force provided by the vacuum source 40 accordingly while the target parcel is being transferred by the robot 10 to the place area. In this way, the system 100 can thus track the suction force applied upon a target parcel by the end effector 20 and adjust such force as needed to ensure the target parcel is successfully transferred to its intended destination by the robot 10.

Referring now to FIGS. 1-7, in this exemplary embodiment, a pre-trained audio classifier model is utilized to infer (identify) a characteristic of a parcel pneumatically engaged by the end effector 20. Specifically, in this exemplary embodiment and implementation, the audio classifier model is a convolutional neural network (CNN) 80 that is configured to analyze the audio data received by the controller 52 to identify the parcel pneumatically engaged by the end effector 20 as one of a number of possible parcel types, which may include, but is not limited to, box-type parcels, flat parcels, bag-type parcels, cardboard-based parcels, and plastic-based parcels. In this implementation, audio data corresponding to the portion of the sound recording shown between lines 60a and 60b in FIGS. 3-5 serves as the input which is related to the possible parcel types by the CNN 80. It is appreciated, however, that the duration of the sound recording serving as the input may vary depending on the particular application and/or environment. Accordingly, in this exemplary embodiment and implementation, classification of the target parcel includes inputting the audio data corresponding to one or more of the vacuum cups 24a, 24b, 24c, 24d engaging the target parcel received by the controller 52 into the CNN 80, which, in this exemplary embodiment and implementation, corresponds to a set of instructions stored in the memory component 56 of the controller 52.

Figure 7:
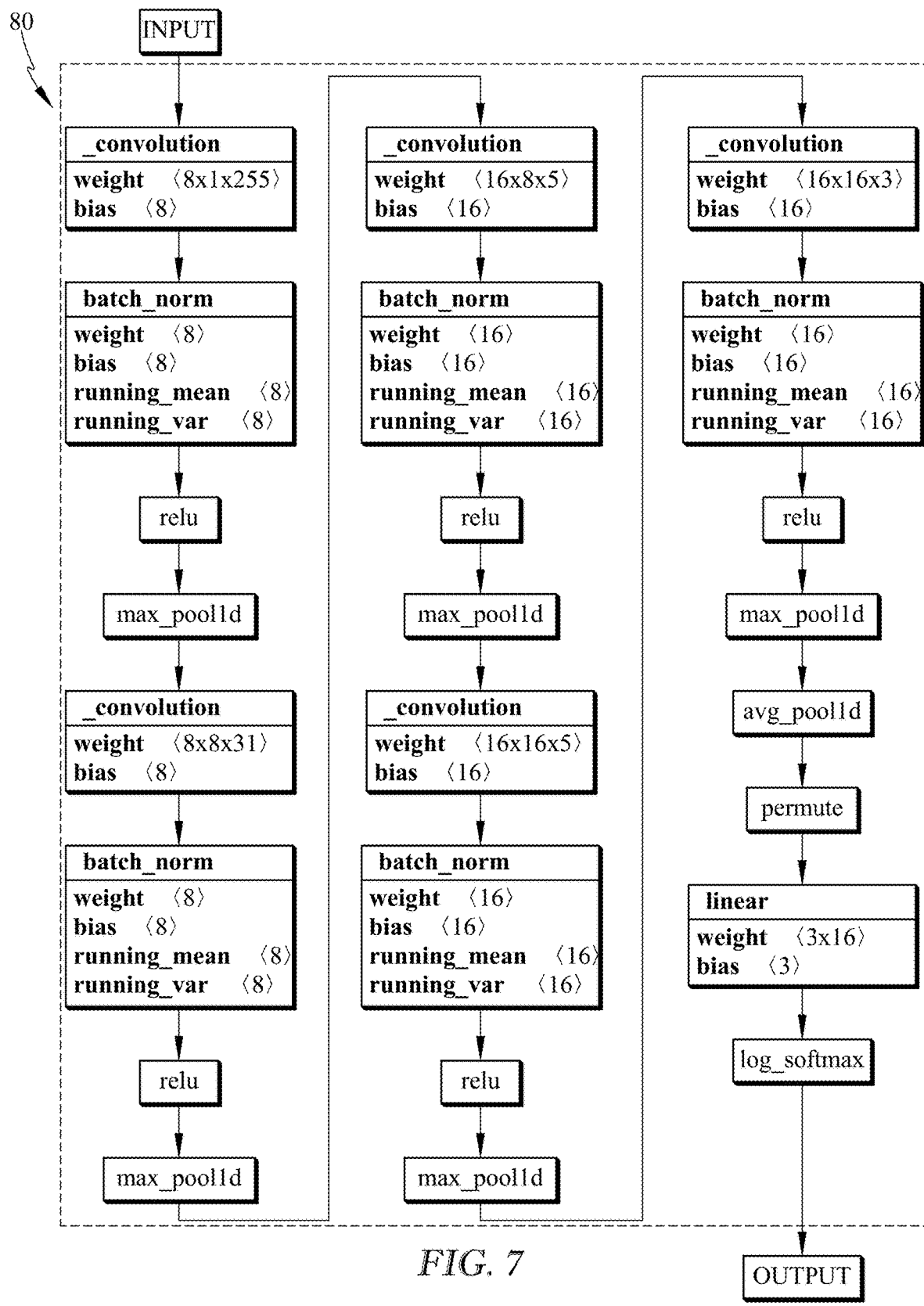
FIG. 7 is schematic view of an exemplary architecture for a convolutional neural network (CNN) based audio classifier for analyzing audio data received by a controller of the exemplary system for detecting parcel engagement and classifying parcels of FIG. 1.

Referring still to FIGS. 1-7, in this exemplary embodiment and implementation, the CNN 80 utilized in the system 100 includes the hidden layer architecture shown in FIG. 7 with certain sets of hyperparameters, and was developed and trained utilizing an open source Pytorch® library. (Pytorch® is a registered trademark of The Linux Foundation of San Francisco, California.) Of course, it is appreciated that, in alternative embodiments, the audio classifier model may be developed to include other suitable hidden layer architectures and/or developed and/or trained using other standard, open-source libraries suitable for developing CNN model architectures adapted to classify audio-based input.

Referring still to FIGS. 1-7, in this exemplary embodiment, the CNN 80 was trained by first acquiring audio data samples (sound recordings) as parcels are engaged and transferred by the robot 10 to an intended destination to serve as training data for the CNN 80. The audio data samples were then stored in a database 70 (FIG. 1) operably connected to the controller 52. In this regard, the following classes of parcels were engaged and transferred by the robot 10 to collect the audio data samples: box-type parcels; poly-bag parcels; and flat parcels. Specifically, 6040 parcels of these types were engaged and transferred by the robot 10 to obtain the audio data samples forming the initial training data for the CNN 80. The CNN 80 was then trained to classify parcel types using a supervised machine learning approach in which the audio data samples forming the initial training data were annotated (or labeled) to reflect the particular parcel type to which each respective audio sample corresponded to. Using the initial training data and the results outputted by the CNN 80 based thereon, the CNN 80 was optimized. Additional audio data samples were then obtained for an additional 1511 parcels (including a mixture of box-type, poly-bag, and flat parcels) as such parcels were engaged and transferred by the robot 10 and transmitted to the controller 52 for input into the optimized CNN 80. Of the 1511 audio samples processed by the controller 52 using the model, 1473 (97.48%) were classified as the correct parcel type. Although the CNN 80 is primarily referred to herein as being trained on and configured to classify box-type parcels, poly-bag parcels, and flat parcels, it is appreciated, that the CNN 80 can be trained as to classify additional and/or alternative parcel types and/or characteristics of target parcels (e.g., cardboard-based parcels, plastic-based parcels, parcels of various weights, etc.) to better accommodate different sorting environments and/or applications.

Referring still to FIGS. 1-7, following optimization of the CNN 80, the controller 52 classifies which type of parcel the target parcel engaged by the end effector 20 is by inputting the audio data corresponding data into the target parcel into the CNN 80, as indicated by block 212 in FIG. 6. Depending on the application and/or sorting environment, various system operations may be influenced or affected based on the type of parcel the target parcel is identified as by the controller 52. In this exemplary embodiment and implementation, the controller 52 is configured to communicate instructions which cause the robot 10 to move a target parcel engaged by the end effector 20 to one of multiple possible intended destinations based on the type of parcel the target parcel is classified as by the CNN 80, as indicated by block 214 in FIG. 6. Depending on the sorting application and/or environment, the intended destinations to which target parcels may vary. For instance, in some implementations, the intended destination for the deposit of box-type parcels may be to a first conveyor, the intended destination for the deposit of bag-type parcels may be to a second conveyor, and the intended destination for the deposit flat parcels may be to a third conveyor. Using the audio data corresponding to the audio signals shown in FIG. 3 and the foregoing intended destination options as an example, upon receiving the audio data corresponding to the audio signal shown in FIG. 3, the controller 52 would, using the CNN 80, classify the target parcel engaged with the end effector 20 as a box-type parcel and subsequently communicate instructions which cause the robot 10 to transfer and deposit the target parcel onto the first conveyor. Similarly, upon receiving audio data corresponding to the audio signal shown in FIG. 5, the controller 52 would, using the CNN 80, classify the target parcel as a flat parcel and subsequently communicate instructions which cause the robot 10 to transfer and deposit the target parcel onto the third conveyor. Furthermore, in this exemplary embodiment and implementation, the controller 52 is configured to communicate instructions which causes the movement speed of the robot 10 to be decreased subsequent to a target parcel being classified as a poly bag to better ensure that the target parcel is not inadvertently dropped during transfer to its intended destination, as indicated by decision 218 and block 220 in FIG. 6.

Referring now to FIGS. 1, 2, and 6, in some implementations, subsequent to determining the type of parcel the target parcel engaged by the end effector 20 is, the controller 52 may transmit information to the database 70 which reflects the fact that the system 100 has encountered a parcel of that type for storage and subsequent use, as indicated by block 216 in FIG. 6. In this way, the system 100, in some implementations, may be utilized to keep a running tally of the different types of parcels processed by the system 100. Accordingly, the parcel classification information generated by the system 100 may be utilized for other applications than informing which intended destination a target parcel should be delivered to. Indeed, implementations are contemplated in which there is only a single intended destination to which target parcels engaged and transferred by the robot 10 are to be delivered. Accordingly, in some alternative embodiments and implementations, the controller 52 may communicate instructions which cause the robot 10 to transfer target parcels to an intended destination without regard to the parcel classification information generated by the system 100.

Of course, the manner in which the operation of the system 100 may be affected based on the parcel type determination made by the controller 52 or audio data generally, is not limited to the above, but, instead, may vary to better accommodate different sorting applications or environments. For instance, in some embodiments and implementations, the controller 52 may process the received audio data to determine whether multiple parcels were inadvertently simultaneously transferred by the robot 10 to the place area and, if needed, take corrective action, for example, in a manner consistent with that employed to address inadvertent transfers of multiple parcels disclosed in U.S. Pat. No. 11,753,256, which, again, is incorporated by reference. Embodiments and implementations in which the controller 52 utilizes the received audio data in conjunction with image data from one or more cameras on the place side of a conveyor system to improve the detection rate of the presence of non-singulated parcels on the place side are also contemplated herein. Additionally, embodiments and implementations in which the controller 52 utilizes the received audio data to determine a specific pathway which the robot 10 should travel along to deliver a target parcel to an intended destination and subsequently communicate instructions which cause the robot 10 to travel along such path are also contemplated herein. For instance, in some implementations, the controller 52 may communicate instructions which cause the robot 10 to travel along one path when the received audio data is indicative of a target parcel engaged by the robot 10 being a box-type parcel and communicate instructions which cause the robot 10 to travel along another, different path when the received audio data is indicative of a target parcel engaged by the robot 10 being a poly bag.

Parcels which may be classified by the system 100 as being a "box-type parcel" include, but are not limited to, parcels which include a formed regular slotted container, a formed half-slotted container, a formed full overlap slotted container, a formed one-piece folder container, a formed full or partial telescope-design container, a formed self-erecting six corner tray container, a formed bliss-style container, a formed die cut container, or other container, which, when formed, retains a cubed or cuboidal shape. Parcels which may be classified by the system 100 as a "flat parcel" include, but are not limited to, parcels which include an envelope (e.g., a non-padded envelope, a padded envelope, a window envelope, a legal envelope, and the like) or another container which, when formed, retains a generally flat shape. Parcels which may be classified by the system 100 as a "poly bag" (i.e., a flexible plastic bag) include, but are not limited to, parcels which include a bag constructed of polyethylene (e.g., high-density polyethylene (HDPE), low-density polyethylene (LDPE), linear low-density polyethylene (LLDPE), medium density polyethylene (MDPE)), polypropylene, or other suitable plastic material.

Figure 8:
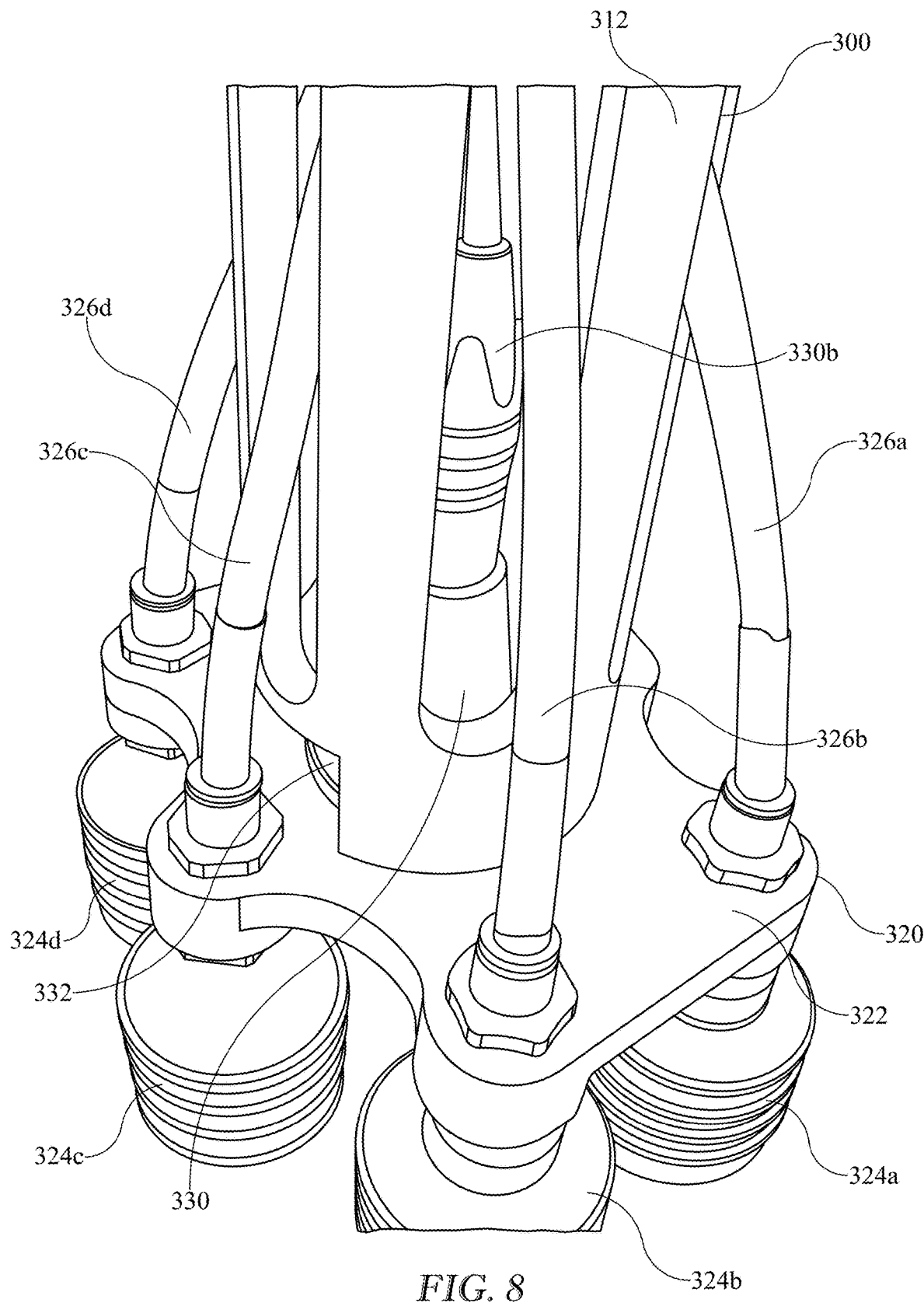
FIG. 8 is a perspective view of another robot, including another exemplary vacuum-based end effector made in accordance with the present disclosure, which may be utilized in the exemplary system for detecting parcel engagement and classifying parcels of FIG. 1.
Figure 9:
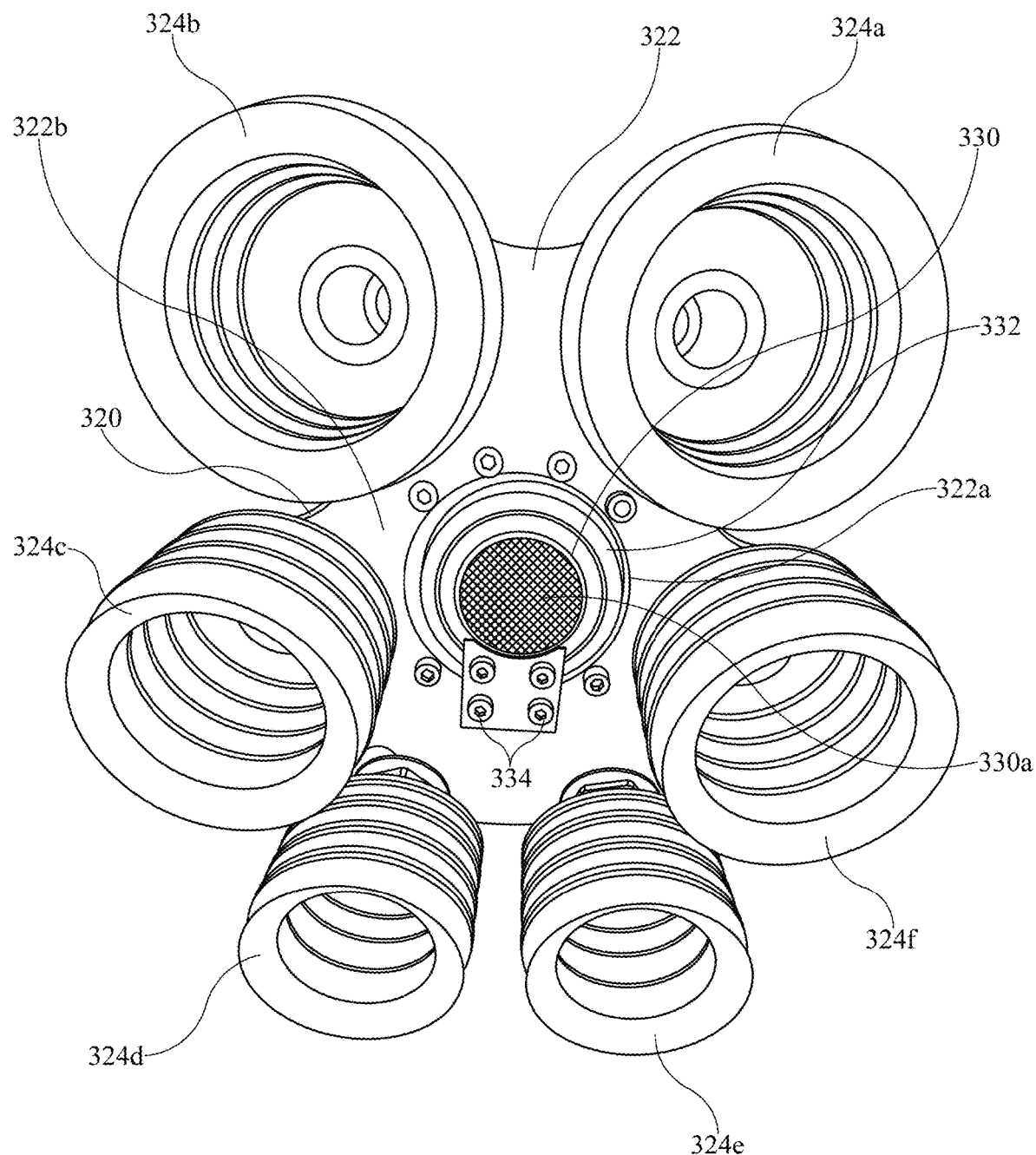
FIG. 9 is a perspective view of the exemplary vacuum-based end effector of FIG. 8.
Figure 10:
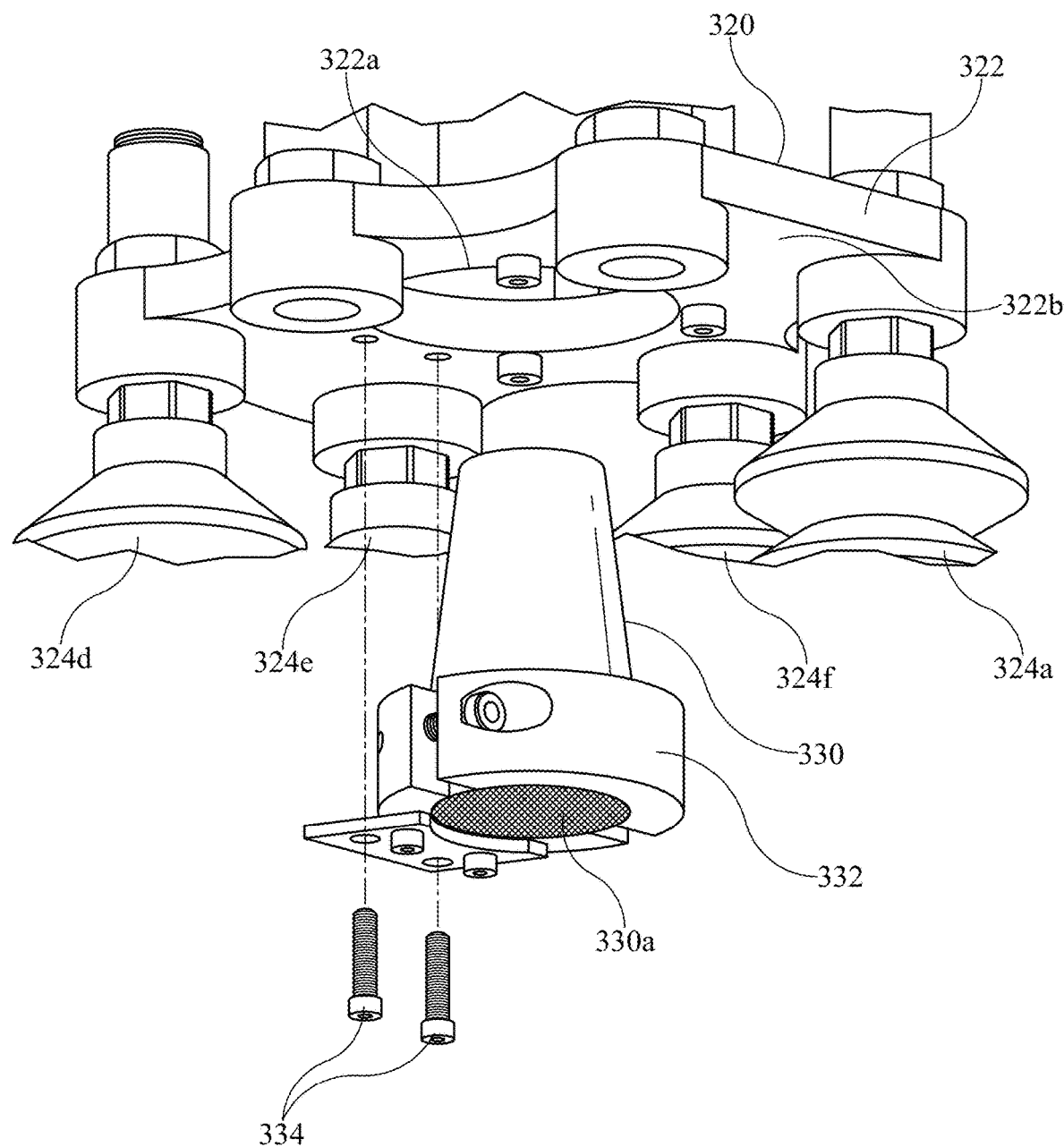
FIG. 10 is a partial exploded view of the exemplary vacuum-based end effector of FIG. 8, but with two vacuum cups and a cable of the microphone of the exemplary vacuum-based end effector removed.

Referring now to FIGS. 8-10, another robot 300, including another exemplary vacuum-based end effector 320 made in accordance with the present disclosure, which may be utilized in the system 100 in place of the robot 10 described above with reference to FIG. 2 is shown. Like the robot 10 described above with reference to FIG. 2, the robot 300 in this exemplary embodiment also includes a framework 312 to which an end effector 320 is mounted. However, in this exemplary embodiment, the framework 312 of the robot is a portion of a six-axis articulating robot arm, which, in this case is a M-10iD/12 robot manufactured by and available from FANUC America of Rochester Hills, Michigan. As shown, the end effector 320 of the robot 300 in this exemplary embodiment is of the same general construction as the end effector 20 described above with reference to FIG. 2. In this regard, the end effector 320 in this exemplary embodiment also includes: a base plate 322 configured for connection to the framework 312 of the robot 300; one or more vacuum cups 324a, 324b, 324c, 324d, 324e, 324f for engaging parcels, which can be placed in fluid communication with vacuum lines 326a, 326b, 326c, 326d that are in fluid communication with the vacuum source 40 (FIG. 1), and which are connected to the base plate 322; and one or more microphones 330, which are positioned to obtain sound recordings (audio data) as the one or more vacuum cups 324a, 324b, 324c, 324d, 324e, 324f, or a subset thereof, engage a target parcel. The end effector 320 in this exemplary embodiment functions, is operably connected, and is utilized in the system 100 in the same manner as the end effector 20 described above with reference to FIG. 2.

Referring still to FIGS. 8-10, in this exemplary embodiment, the end effector 320 includes a total of six vacuum cups 324a, 324b, 324c, 324d, 324e, 324f, which are positioned in a ring-like arrangement. The lip of each respective vacuum cup 324a, 324b, 324c, 324c, 324d, 324e, 324f is, in this exemplary embodiment, composed of nitrile rubber to promote better engagement with poly bags. Vacuum cups of such construction include the FSGC 50 NBR-55 G3/8-AG bellows suction cups, distributed by Schmalz GmbH of Glatten, Germany. Like the end effector 20 described above with reference to FIG. 2, in this exemplary embodiment, the end effector 320 also includes a single microphone 330. The microphone 330 in this exemplary embodiment is centrally positioned between the six vacuum cups 324a, 324b, 324c, 324d, 324e, 324f, such that the microphone 330 is substantially equidistant to each respective vacuum cup 324a, 324b, 324c, 324d, 324e, 324f. In this exemplary embodiment, the e 604 microphone manufactured and distributed by Sennheiser Wedemark, Germany was utilized for the microphone 330 due to its cardioid pickup pattern. Such pickup pattern is believed help to eliminate more ambient noise as compared to other microphones, such as the Lavalier GO microphone. In this exemplary embodiment, the microphone 330 is mounted to the base plate 322 via a bracket 332. Specifically, in this this exemplary embodiment, the bracket 332 is a collar bracket which defines a central opening 332a in which the head 330a of the microphone 330a is received. The bracket 332 is partially received in a central opening 322a defined by the base plate 322 and mounted to a bottom surface 322b of the base plate 322 via fasteners 334. Of course, the bracket 332 may be of an alternative type and/or alternatively mounted to the base plate 322 in a manner suitable as to enable the microphone 330 to obtain audio data of the vacuum cups 324a, 324b, 324c, 324d, 324e, 324f engaging target parcels without departing from the spirit and scope of the present disclosure. In some embodiments, one or more portions of a cable 330b of the microphone 330 may be secured to the framework 312 of the robot 300 and/or to the vacuum lines 326a, 326b, 326c, 326d via suitable fasteners, such as cable ties.

Although reference is sometimes made herein to the sound recordings obtained by the microphone 30, 330 corresponding to instances where each vacuum cup 24a, 24b, 24c, 24d, 324a, 324b, 324c, 324d, 324e, 324f of the end effector 20, 320 is engaged with a target parcel, it should be appreciated that system operations described herein can similarly be carried out utilizing sound recordings obtained by the microphone 30, 330 corresponding to instances where not all of the vacuum cups 24a, 24b, 24c, 24d, 324a, 324b, 324c, 324d, 324e, 324f are engaged with the target parcel without departing from the spirit and scope of the present disclosure. For instance, in some embodiments and implementations, the sound recordings obtained by the microphone 30, 330 may correspond to only a single vacuum cup of the end effector 20, 320 being engaged with a target parcel. Furthermore, while the system 100 is primarily referred to herein as including a single microphone, alternative embodiments and implementations in which the system 100 includes multiple microphones, with the sound recordings obtained by each respective microphone being processed by the controller 52 as audio data in a manner consistent with that described above with reference to FIG. 6 to determine whether the end effector 20, 320 is sufficiently pneumatically engaged with a target parcel and/or classify the target parcel.

Although the system 100 is primarily referred to herein as including only robot 10, 300 without reference to additional robots, it should be appreciated that alternative embodiments and implementations in which the robot 10, 300 is but one of multiple robots for engaging and transferring parcels in the system 100 are also contemplated herein.

Although the microphone 30, 330 is primarily described herein the context of being a component of the end effector 20, 320, alternative embodiments in which the microphone 30, 330 is a component of the system 100 which forms no part of the end effector 20, 320, but is still operably connected to the control subsystem 50 in the manner described above and positioned as to obtain sound recordings of some or all of the vacuum cups 24a, 24b, 24c, 24d, 324a, 324b, 324c, 324d, 324e, 324f of the end effector 20, 320 as they engage a target parcel are also contemplated herein. For instance, in some embodiments and implementations, the microphone 30, 330 may be mounted to a conveyor, such that the microphone 30, 330 is positioned adjacent to an area of the conveyor from which parcels are engaged and transferred.

Although reference is sometimes made herein to the robot 10, 300 performing parcel singulation operations, it should appreciated that the operations which the robot 10, 300 may perform in use are not so limited. Rather, the robot 10, 300 may be utilized in other parcel engagement and/or parcel transfer applications without departing from the spirit and scope of the present disclosure.

Although the end effector 20, 320 is primarily described herein as being a vacuum-based end effector, alternative embodiments in which the end effector 20, 320 is a non-pneumatic-based end effector and whose engagement with different types of parcels produces different sounds are also contemplated herein. For instance, in an alternative embodiment, the end effector of the system 100 may be an end effector which is configured to mechanically grip (e.g., using mechanical fingers) target parcels. In such embodiment, the microphone 30, 330 would obtain audio data corresponding to the end effector mechanically gripping target parcels. It is believed that, as with the vacuum cups 24a, 24b, 24c, 24d, 324a, 324b, 324c, 324d of the end effectors 20, 320 described above, the sound recordings obtained by the microphone 30, 330 and corresponding to the mechanical gripping of target parcels will vary significantly depending on the type of parcel engaged, and thus effectively serve as identifiers which can be utilized by the control subsystem 50 to classify (identify) engaged parcels. Accordingly, in alternative embodiments in which the system 100 utilizes an end effector configured to mechanically grip target parcels, the audio classifier model can be trained in similar fashion as described above to detect parcel type or another characteristic of target parcels utilizing training data corresponding to audio samples generated by virtue of the end effector mechanically gripping a variety of parcels.

Although the controller 52 is described herein, in some embodiments, as analyzing the intensity (loudness) of received audio data to inform certain determinations and/or perform certain operations, it should be appreciated that other audio signal characteristics which are indicative of engagement of the end effector 20, 320 with a target parcel or the type of parcel with which the end effector 20, 320 is engaged may alternatively be analyzed to inform such determinations and/or perform such operations without departing from the spirit and scope of the present disclosure.

Although the system 100 is primarily described herein as being configured to both detect whether the end effector 20, 320 is sufficiently pneumatically engaged with a target parcel and classify the type of parcel the target parcel is, alternative embodiments in which the system 100 is configured to perform only one of the foregoing operations are also contemplated herein.

It is appreciated that each operation performed by the exemplary system 100 described herein can also be characterized as a method step, unless otherwise specified or context precludes. For instance, in view of the system operations described above, it should be appreciated that an exemplary method for classifying parcels in which: one or more processors process audio data received from one or more microphones, with the audio data corresponding to a robot engaging a parcel; and the one or more processors classify the parcel as a particular parcel type based on the processed audio data is expressly contemplated herein. It is also appreciated that each method step described herein can also be characterized as an operation performed by the system 100, unless specified otherwise or context precludes.

One of ordinary skill in the art will recognize that additional embodiments and implementations are also possible without departing from the teachings of the present invention. This detailed description, and particularly the specific details of the exemplary embodiments and implementations disclosed herein, are given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A system for engaging and transferring parcels, comprising:
    a robot configured to engage and transfer parcels;
    one or more microphones configured and positioned to obtain audio data corresponding to the robot engaging a parcel when the system is in use; and
    a control subsystem, including
        a controller operably connected to the robot, the controller including a processor for executing instructions stored in a memory component to (i) receive and process the audio data obtained by the one or more microphones, with the audio data corresponding to the robot engaging the parcel, and (ii) identify a characteristic of the parcel based on the audio data obtained by the one or more microphones.

2. The system as recited in claim 1, wherein the controller is configured to identify the parcel as being one of a box-type parcel, a flexible plastic bag, and a flat parcel.

3. A system for engaging and transferring parcels, comprising:
    a robot configured to engage and transfer parcels, the robot including a framework and a vacuum-based end effector mounted to the framework, the vacuum-based end effector including
        a base plate mounted to the framework,
        one or more vacuum cups connected to the base plate and configured to be placed in fluid communication with a vacuum source, and
        one or more microphones configured and positioned about the vacuum-based end effector, such that the one or more microphones obtain audio data corresponding to the one or more vacuum cups engaging a parcel when the system is in use; and
    a control subsystem, including
        a controller operably connected to the robot, the controller including a processor for executing instructions stored in a memory component to (i) receive and process the audio data obtained by the one or more microphones, with the audio data corresponding to the one or more vacuum cups engaging the parcel, and (ii) at least one of (A) detect whether the one or more vacuum cups are pneumatically engaged with the parcel based on the audio data obtained by the one or more microphones and (B) identify a characteristic of the parcel based on the audio data obtained by the one or more microphones.

4. The system according to claim 3,
    wherein the controller detects whether the one or more vacuum cups are pneumatically engaged with the parcel based on the audio data obtained by the one or more microphones when the system is in use; and
    wherein the memory component further include instructions, which, when executed by the processor, cause the controller to (iii) communicate instructions which affect operation of the robot and/or the vacuum source based on the audio data obtained by the one or more microphones.

5. The system according to claim 3,
    wherein the controller identifies the characteristic of the parcel based on the audio data obtained by the one or more microphones when the system is in use; and
    wherein the characteristic of the parcel is parcel type.

6. The system according to claim 5, wherein the controller identifies the characteristic of the parcel by inputting the audio data obtained by the one or more microphones into an audio classifier model configured to identify parcel type based on audio data.

7. The system as recited in claim 6, wherein the audio classifier model is a neural network pre-trained on a collection of audio samples obtained by the one or more microphones, the collection of audio samples including audio samples corresponding to the one or more vacuum cups engaging a plurality of parcels of different types at different times.

8. The system according to claim 7, wherein the neural network is a convolutional neural network.

9. The system according to claim 5, wherein the memory component further include instructions, which, when executed by the processor, cause the controller to (iii) communicate instructions which cause the robot to transfer the parcel to one of multiple potential locations based on the particular parcel type of the parcel.

10. The system as recited in claim 3,
    wherein the one or more vacuum cups includes a plurality of vacuum cups; and
    wherein the one or more microphones includes a microphone positioned between at least two vacuum cups of the plurality of vacuum cups.

11. The system as recited in claim 3,
    wherein the one or more vacuum cups includes a plurality of vacuum cups; and
    wherein the one or more microphones includes a microphone mounted to the base plate in a position centrally positioned relative to the plurality of vacuum cups.

12. The system as recited in claim 3,
    wherein the one or more vacuum cups includes a plurality of vacuum cups; and
    wherein the one or more microphones is a single microphone positioned to obtain sound recordings of each of the plurality of vacuum cups as the plurality of vacuum cups engage the parcel.

13. The system as recited in claim 3,
    wherein the controller detects whether the one or more vacuum cups are pneumatically engaged with the parcel based on the audio data obtained by the one or more microphones when the system is in use; and wherein the controller identifies the characteristic of the parcel based on the audio data obtained by the one or more microphones when the system is in use.

* * * * *